United States Patent
Westwood, III

[11] Patent Number: 5,913,479
[45] Date of Patent: Jun. 22, 1999

[54] SNAP HOOK WITH PIVOTAL GATE

[76] Inventor: Samuel M. Westwood, III, 2005 Linden, Bethlehem, Pa. 18017

[21] Appl. No.: 08/715,419

[22] Filed: Sep. 18, 1996

[51] Int. Cl.[6] .............................. A44B 13/02; B66C 1/36; F16G 11/00

[52] U.S. Cl. ............................................ 24/298; 24/600.9

[58] Field of Search ........................ 24/369–373, 265 H, 24/265 CD, 599.8, 598.5, 601.5, 601.7, 601.9, 599.1, 600.9, 601.3, 298, 3.12; 294/82.19, 82.2

[56] References Cited

U.S. PATENT DOCUMENTS

| | | |
|---|---|---|
| 171,984 | 1/1876 | Bullwinkle . |
| 227,221 | 5/1880 | Dillaby . |
| 271,713 | 2/1883 | Jones . |
| 1,336,383 | 4/1920 | Shimizu . |
| 1,516,875 | 11/1924 | Allen et al. . |
| 1,557,603 | 10/1925 | Morrett . |
| 1,709,235 | 4/1929 | Shaffer . |
| 1,764,813 | 6/1930 | Thornley . |
| 2,033,766 | 3/1936 | Hall et al. ................................ 24/236 |
| 2,357,478 | 9/1944 | Koch . |
| 3,501,817 | 3/1970 | Bambenek et al. ...................... 24/233 |
| 3,672,004 | 6/1972 | Smith . |
| 4,539,732 | 9/1985 | Wolner .................................. 24/241 R |
| 5,005,266 | 4/1991 | Fister et al. ............................ 24/601.5 |
| 5,127,219 | 7/1992 | Herron et al. ...................... 24/599.4 X |
| 5,207,171 | 5/1993 | Westwood, III ........................ 114/218 |

*Primary Examiner*—James R. Brittain
*Assistant Examiner*—Robert J. Sandy

*Attorney, Agent, or Firm*—Jacobson, Price, Holman & Stern, PLLC

[57] ABSTRACT

Various improved snap hooks having generally S-shaped bodies are used to engage spaced objects. In one embodiment, the snap hook has three sections; an eyelet, hook and hinged gate. The hook has a shank leading to a curved section that terminates in a receiving end. The receiving end has a notch on the lip of an inside surface. A metal wire gate extends from a supporting portion located on the eyelet and is biased closed against the notch. The gate has a long arm and a short arm, each terminating in a stem element. The gate is bowed to conform with the shape of the snap hook. When opened, the gate straddles either side of the shank so as to maximize the size of the aperture created when the gate is opened. In a first embodiment, the supporting portion is two supporting holes. The stem of each the long and short arms are inwardly turned so as to fit into respective supporting holes. In a second embodiment, the supporting portion is a single supporting hole. The stem of each the short arm and the long arm are inwardly turned. The stem of the short arm rests on the front surface of the eyelet and the stem of the long arm fits into the supporting hole. In another embodiment, the supporting portion is a single supporting hole. The stem of the short arm is inwardly turned and fits into the supporting hole. The stem of the long arm wraps around the base of the eyelet. The wrapped arm provide support to prevent lateral displacement of the gate. In additional embodiments, the gate is constructed of plastic material and includes a mounting structure that can be easily assembled onto the S-shaped hook. In all embodiments, the gate can be replaced when necessary.

11 Claims, 10 Drawing Sheets

SNAP HOOK WITH PIVOTAL GATE

BACKGROUND OF THE INVENTION

1. Field of the Invention

The present invention relates to a safety link for interconnecting spaced objects. More particularly, the present invention relates to a self-closing snap hook having a pivoted gate which will overlie a substantial portion of the shank of the hook in the open position in order to provide an unobstructed and extra large mouth.

2. Description of the Related Art

Links have been developed to interconnect a plurality of spaced objects, such as chains, hooks, ropes and other like articles. Snap links have a hinged gate that opens and closes to permit selective engagement with an object. A snap hook is a type of link that has a generally hook-shaped member at one end. Common snap hooks are shown, for example, in U.S. Pat. No. 171,984 to Bulwinkle, U.S. Pat. No. 1,516,875 to Allen, et al., and U.S. Pat. No. 227,221 to Dillaby. These conventional snap hooks essentially have three components; engaging means or eyelet, hook and hinged gate. Snap hooks are generally formed of a singular body and are usually made of metal. The eyelet and gate, on the other hand, can either be formed integrally with the body, or may be connected thereto.

The eyelet is generally an annular ring defining a central hole. The eyelet attaches to a first object, normally in a permanent fashion. However, as shown by Allen, et al., eyelets are also known having a gate for attachment and detachment of the eyelet with the desired object. As further shown by Allen, et al., swivel snap hooks permit the eyelet to swivel about the hook portion.

The hook portion generally has a shank section leading into a curved top section forming the generally hook shape. The shank section is the portion of the snap hook that extends from the eyelet up to the curved section. The lower portion of the shank is connected to the eyelet, and the top of the shank connects to the curved section of the hook. The curved section of the hook functions to fasten with the second spaced object.

The curved section of the hook terminates in a receiving end where the second spaced object is received. The receiving end of the curved or hook section defines an opening or mouth of the snap hook. The hinged gate attaches at a securing section of the snap hook. The securing section is generally located at the base of the shank. The hinged gate attaches to the securing section and extends linearly to rest on the inner side of the receiving end of the hook.

The gate operates to close the opening defined by the receiving end of the hook so that the gate must be opened before an object may be attached or detached. The gate is normally attached to the snap hook in a manner which creates a spring or biasing action to maintain the gate in a closed position. A force is therefore necessary to be applied to open the gate, which pivots about the securing position on the snap hook.

Figures 1A, 1B, 1C, 2, 3:
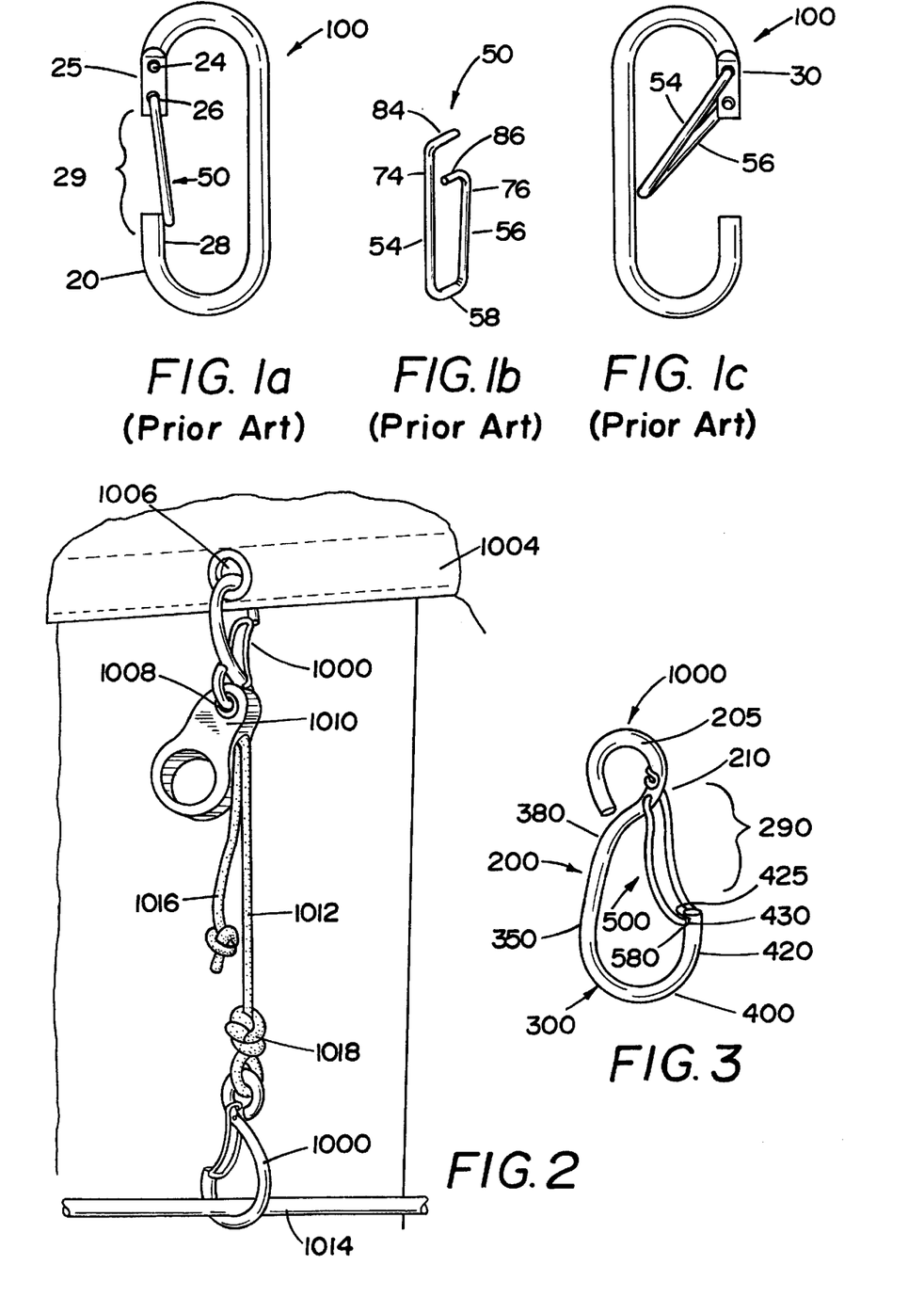

Various shapes have been employed for conventional links. FIGS. 1a, 1b and 1c illustrate one type of prior art link 100 in which the body of the link consists of a single round metal shank formed in a generally C-shape with two ends, a securing end 25 and a receiving end 20. The oblong C-shape of link 100 forms a mouth 29 between ends 20 and 25. As further shown in FIG. 1b, gate 50 is a single piece typically made of heavy round metal wire, having two ends 74, 76. The gate wire is bent to form an oblong shape having a closed U-shaped head 58, a long arm 54 and a short arm 56 which converge upwardly. The ends 74, 76 of gate 50 are each turned inward at a rounded right angle to form stems 84, 86, respectively. One of arms 54, 56 is raised with respect to the other arm by being pivoted or twisted at the point connecting the arm to head 58. Accordingly, if gate 50 is placed on a level surface, the head 58 and one arm 54, 56 will lay flat, while the other arm will form an upward angle with the surface. This result will occur regardless of which arm 54, 56 is placed on the level surface.

The securing end 25 of link 100 is slightly tapered to form flattened side surfaces, and two linearly adjacent supporting holes 24, 26 are bored therethrough. The diameter of the wire for gate 50 is substantially smaller than the diameter of link 100 so that stems 84, 86 of gate 50 fit into the supporting holes 24, 26, respectively with the ends being peened over. The stems 84, 86 are of sufficient length to pass into the entire length of supporting holes 24, 26, respectively, without extending outside the respective supporting hole 24, 26. Supporting holes 24, 26 pivotally connect gate 50 with link 100 so that gate 50 may be opened and closed.

In the closed position of FIG. 1a, gate 50 extends to the inside lip 28 of the receiving end 20 of link 100. Since one arm 54, 56 of gate 50 is twisted and supporting holes 24, 26 are linearly aligned, a spring-like force is created when gate 50 is connected to the securing end 25. Accordingly, head 58 of gate 50 is biased to the closed position against the inside of lip 28 of the receiving end 20 of link 100. As shown in FIG. 1c, gate 50 may be opened by applying an inward force on the gate. In the open position, arms 54, 56 become twisted in opposition to the position gate 50 assumes in the at rest position. Accordingly, the long arm 54 will recede further into link 100 than short arm 56, as shown in FIG. 1c. Consequently, the further gate 50 is opened, the greater the force required so that gate 50 becomes more difficult to open as the gate is urged toward the open position shown in FIG. 1c with the holes and length of arms serving to form a stop or cause bending of head 58.

This conventional link has further disadvantages. The gates are straight, so that when gate 50 is opened, a space is created between the gate and the shank. For instance, as shown in FIG. 1c, wasted space is created between gate 50 and the upper portion of link 100. Consequently, the size of the opening created when gate 50 is opened is substantially limited. In addition, the lateral stability of gate 50 is solely dependent upon the support that supporting holes 24, 26 provide to stems 84, 86.

SUMMARY OF THE INVENTION

Accordingly, it is a primary object of the present invention to provide a snap hook with a pivotal gate that maximizes the opening created when the gate is opened to permit easier and better connection with the object to be hooked.

It is a further object of the snap hook of this invention to greatly reduce or eliminate lateral displacement of the gate.

It is a still further object of this invention to provide a snap hook which has greater lateral stability and support for the gate when the gate is fully open, partially open, or closed.

It is yet another object of the snap hook of the present invention to have a gate that is opened by a uniform application of force of far lesser magnitude than available in prior art designs.

In accordance with the foregoing objects the snap hook of the present invention is formed from a single rod of metal or one-piece plastic molding into an S-shape, with an eyelet at the top of the shank and a curved hook section at the bottom of the shank. A securing section is located on or near the eyelet, and the curved hook section terminates in a receiving end defining the mouth of the snap hook. The receiving end has a notch on the lip of the inside surface. A gate, made of round metal spring wire, is attached to the snap hook at the securing section and is biased closed against the notch of the lip. The gate has a long arm and a short arm, each terminating in a stem element.

In a first embodiment, the securing section includes two supporting holes located on the eyelet. The stem of each of the long and short arms are inwardly turned so as to fit into respective securing holes. One hole is circular to snugly receive the stem of one arm and the other is more like a slot to allow the stem of the other arm to slide vertically therein during opening and closing of the gate. In a second embodiment, the securing section includes only a single securing hole located on or near the eyelet. As in the first embodiment, the stem of each the short arm and the long arm are inwardly turned. The stem of the short arm rests and slides on the front surface of the eyelet and the stem of the long arm fits into the securing hole. In another embodiment, the securing section again includes a single securing hole located on the eyelet. The stem of the short arm is inwardly turned and fits into the securing hole. The stem of the long arm is bent around to generally conform to the cross-section of the eyelet portion and wraps around the base or inside surface of the eyelet. The wrapped stem is designed to slide along the inside surface of the eyelet during movement of the gate. The wrapped arm also provides support to prevent lateral displacement of the gate during operation. In another embodiment the gate is constructed of plastic material with the gate member pivoting at a "living hinge".

A notch is preferably formed on the inside of the lip at the receiving end in order to receive the head of the gate. The notch provides support to reduce lateral displacement of the gate when the gate is in a closed position and reinforces the hook to prevent it from straightening in the event excessive weight or force is applied to the hook. In addition, the notch permits the head of the gate to lie flush with the inside surface of the hook. Thus, the gate will not interfere with the movement of any object contained within the closed hook.

The gate is also bowed inwardly to conform with the S-shape of the shank. When opened, therefore, a significant length of the gate straddles a portion of the shank so as to maximize the size of the opening in the hook created when the gate is opened. The straddling further provides lateral support to prevent lateral displacement of the gate when fully opened, partially opened, or closed.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1a is a side view of a prior art link having a gate in a closed position.

FIG. 1b is a perspective view of the gate used in the link of FIG. 1a.

FIG. 1c is a side view of the prior art link of FIG. 1a seen from the other side with the gate in an open position.

FIG. 2 shows a snap hook in accordance with the present invention as used to secure a tarpaulin to a tie rod on a tractor trailer using an adjustable rope lock made in accordance with my earlier U.S. Pat. No. 5,207,171.

FIG. 3 is a perspective view of a snap hook in accordance with the present invention.

DETAILED DESCRIPTION OF THE PREFERRED EMBODIMENTS

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Now turning to the drawings, FIG. 2 generally shows the snap hook 1000 of the present invention used to secure a tarpaulin 1004 covering a load body on a truck trailer or the like. A first snap hook 1000 is removably attached to an eye or grommet 1006 of the tarpaulin and permanently attached to the passageway 1008 of an adjustable rope lock 1010. A second snap 1000 is also attached to the opposite end of the rope 1012 and removably attached to a fixed position on the load body 1013, such as tie bar 1014. The adjustable rope lock 1010 is made in accordance with my prior U.S. Pat. No. 5,207,171, which is incorporated herein by reference entitled "Adjustable Rope Lock", for all purposes and is marketed under the trademark "ROPELOCK", by Westwood Inventive Technology Corporation of Bethlehem, Pa. By use of the adjustable rope lock the length of the rope between the tie bar 1014 and rope lock 1010 can be adjusted.

Once the hook snaps 1000 are connected to the respective objects, the free rope end 1016 is pulled to move rope 1012 through rope lock 1010 and secure the tarpaulin. The adjustable rope lock 1010 releasably lock the rope 1012 in adjusted position. The free end 1016 of the rope may additionally be tied around the adjustable rope lock to further fix the position of the rope as described in my aforesaid patent. The tarpaulin may loosen, however, due to a shrinking, settling, or shifting of the truck load. Regardless, the snap hooks 1000 will remain attached to the objects, rather than disconnecting and causing a dangerous condition or becoming lost. The tarpaulin may then be secured by pulling on the free end 1016 of the rope until the tarpaulin is again tight.

FIG. 3 shows the snap hook 1000 of the present invention in greater detail. Snap hook 1000 essentially comprises an S-shaped body 200 having an engaging portion or eyelet 205 and a hook 300 having a shaft or shank 350 and a curved section 400, all formed from a single piece, preferably metal rod, made of steel or the like, bent into the desired S-shape. Hinged gate 500 is mounted on body 200 at or near the eyelet at a securing section 210. In this configuration, the eyelet 205 is preferably a substantially closed circle that terminates at ridge 380 of shank 350. This configuration maximizes the interior space defined by hook 300 so that hook 300 may accommodate the largest possible object in relation to the size of eyelet 205.

Eyelet 205 functions to engage the first object, and the first object may be permanently attached to eyelet. For instance, referring back to FIG. 2, the eyelet 205 of the first snap hook 1000 is shown permanently connected to the passageway of the adjustable rope lock 1010. Alternatively, objects may be attached to eyelet temporarily. For instance, referring again to FIG. 2, rope 1012 is removably secured to the eyelet of a second snap hook 1000 by knot 1018.

Turning again to FIG. 3, it will be seen that shank 350 projects outwardly from ridge 380 to extend beyond the outermost edge of eyelet 205 on the side furthest from mouth 290 (shown in FIG. 3 as the left side of eyelet 205). Curved section 400 extends from shank 350 and terminates in a receiving end 420, which overhangs the near side of eyelet 205 (shown in FIG. 3 as the right side of eyelet 205). By extending from the foremost portion of eyelet 205 to overhang the near side of eyelet 205, the inner space defined by hook 300 is maximized in relation to the size of eyelet 205.

Receiving end 420, in conjunction with securing section 210, form the mouth 290 of the snap hook 1000 for receiving objects. Hook 300 attaches to the object that is received through the mouth of the snap hook. The area defined by hook 300 and gate 500 is substantially larger than the space defined by eyelet 205. Accordingly, hook 300 may attach to objects having a wider range of sizes and shapes than eyelet 205.

In the closed, at rest position, hinged gate 500 extends from its connect point or securing section 210 on eyelet 205 to the inside lip 425 of receiving end 420 so as to form a barrier across the mouth of snap hook 1000. In the preferred embodiment, securing section 210 is located on the outermost portion of eyelet 205 nearest mouth 290. However, one of ordinary skill in the art will recognize that the securing section 210 may be located at many points along eyelet 205 or shank 350. In addition, the securing section 210 may be tapered to form flattened side surfaces.

Gate 500 is biased so that head 580 rests in notch 430 located on the inside lip 425 of receiving end 420. The notch 430 is laterally spaced from the terminus of receiving end 420 and conforms with the shape of gate head 580. As will be discussed in further detail below, notch 430 provides support to reduce lateral displacement of gate 500, and head 580 may have a boss or protrusion that overhangs either side of receiving end 420 so as to further prevent lateral displacement of gate 500.

In accordance with a preferred embodiment of the present invention, the S-shaped body 200 of snap hook 1000 is formed from mild steel rod having a diameter of about ¼ inch. When used in association with boats, stainless steel will be used. The gate is formed from small diameter spring steel wire depending on the closing force desired.

Hook 300 and eyelet 205 are formed from a metal mold from which notch 430 is punched out. Eyelet 205 is molded to be slightly open so that objects may be secured to eyelet 205 before it is bent into its final position. Thereby, objects may be permanently affixed within eyelet 205. Hinged gate 500 is formed by bending the metal wire. Hinged gate 500 is then attached to snap hook 1000 in the manner to be discussed in further detail below.

Figures 4A, 4B:
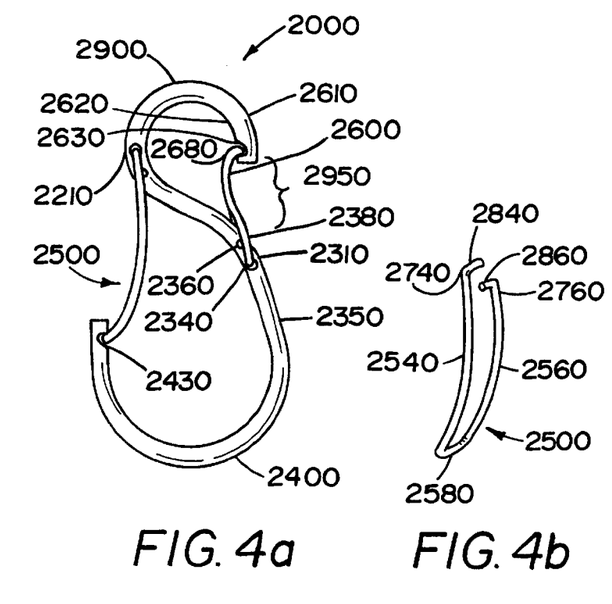
FIGS. 4a, 5a and 6a are left side views of a snap hook having the gate in the closed position in accordance with a first, second and third embodiment of the present invention, respectively.
FIGS. 4b, 5b and 6b are perspective views of the gates used in the hooks of FIGS. 4a, 5a and 6a, respectively.

FIGS. 4*a*, *b* and *c* show a double-gated snap hook 2000 in an alternative embodiment of the present invention. Primary hook 2400 and primary hinged gate 2500 are configured in a manner similar to the snap hook of FIG. 3, above. However, in the present embodiment, the eyelet 205 is formed as a secondary hook 2900. Secondary hook 2900 has a mouth 2950 defined by the receiving end 2610 of the secondary hook 2900 and ridge 2380 of shank 2350 of primary hook 2400. A secondary hinged gate 2600 extends from securing portion 2310 on shank 2350 to the inside of lip 2620 on the receiving end 2610 of secondary hook 2900. In the preferred embodiment, securing portion 2310 is positioned on ridge 2380. A notch 2630 is located on the inside surface of lip 2620 for receiving the head of secondary gate 2900. The secondary hook 2900 permits quick and easy attachment and detachment of objects, rather than the more fixed attachment provided by an eyelet, such as in the FIG. 3 configuration.

Notch 2430 has an elongated circular shape to conform with the shape of head 2580. Notch 2430 is shown in the figures as being inclined at an upward angle to correspond with the movement of head 2580 as gate 2500 opens, closes, and mates with notch 2430. If a lateral force is applied to gate 2500, the top of arms 2540, 2560 adjacent the head 2580 will contact the lip 2460 of notch 2430. In this manner, notch 2430 provides a stop to arms 2540, 2560 to prevent lateral displacement of head 2580 and therefore the gate 2500.

In accordance with this embodiment as depicted in FIG. 4b, gate 2500 is a single round metal wire having opposite ends 2740, 2760. The gate wire is bent to form an oblong shape having a closed U-shaped head 2580, a long arm 2540, and a short arm 2560. The ends 2740, 2760 of arms 2540, 2560 are each turned inward at a rounded right angle to form stems 2840, 2860, respectively. In the preferred embodiment, one of the arms 2540, 2560 is raised with respect to the other arm by being pivoted or twisted at the point connecting the arm to head 2580.

Figure 4C:
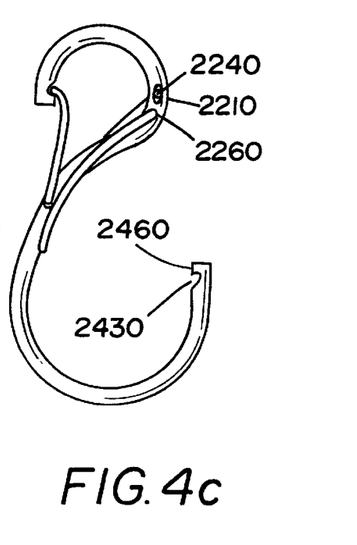
FIGS. 4c, 5c and 6c are right side views of the snap hooks of FIGS. 4a, 5a and 6a, respectively, with the gate in an open position.

As shown, gate 2500 is bowed inward to conform with the shape of the respective portion of secondary hook 2900. Particularly, gate 2500 conforms with the shape of secondary hook 2900, ridge 2380 and shank 2350. Accordingly, when gate 2500 is opened, as shown in FIG. 4c, arms 2540, 2560 will generally align with and straddle the respective portions of the secondary hook 2900, ridge 2380 and shank 2350. This permits an object being received in primary hook 2400 to have unrestricted access to the entire inner space defined by the hook 2400. Further, the secondary hook 2900 will serve as a stop for gate 2500 to prevent lateral displacement when gate 2500 is in the full open position. Gate 2500 also is more responsive to receiving objects pressed against it since the bowed configuration directs the object toward the receiving hook 2400. Likewise, a person is better able to open the bowed gate since the bow of the gate tends to grip the finger. A straight gate, on the other hand, could tend to cause the finger to slide along the gate.

In accordance with this embodiment of the present invention, gate 2500 is attached to snap hook 2000 by first placing the stem 2860 of short arm 2560 in a respective supporting hole 2260. Since arms 2540, 2560 of gate 2500 are twisted about head 2580, the other stem 2840 will rest to the outside of securing section 2210. Next, long arm 2540 is pulled away from arm 2560 and the free stem 2840 is positioned over the vacant supporting hole 2240. Arm 2740 is then permitted to retract, and stem 2840 recedes into the respective supporting hole 2240.

At this point, gate 2500 is pivotally anchored to snap hook 2000. The procedure for attaching gate 2500 to securing section 2210 is then repeated for gate 2600 and respective securing holes 2340, 2360 of the secondary hook 2900. The procedure for attaching gates 2500 and 2600 to snap hook 2000 can be accomplished by hand or machine.

Once anchored, stems 2840, 2860 pivot within respective securing holes 2240, 2260 so that gate 2500 may be freely opened and closed. The configuration of gate 2500 creates a spring-like force such that the head 2580 of gate 2500 is biased closed against the inside lip 2430 of the receiving end 2460 of snap hook 2000. Securing holes 2240, 2260 are shown being substantially linear with each other. However, securing holes 2240, 2260 may be offset so that a greater spring force develops in gate 2500. Also, as shown in FIG. 4c, supporting hole 2240 is preferably in the shape of a small arcuate slot which allows stem 2840 to slide therein as gate 2500 opens and closes. This allows gate 2500 to open with a generally uniform force.

Lateral support is proportional to the length of stems 2840, 2860, the length of the respective supporting hole 2240, 2260 and the close fit between stems 2840, 2860 and supporting holes 2220, 2240. In the preferred embodiment, stems 2840, 2860 fit snugly into supporting slot 2240 and hole 2260, respectively. Lateral support of gate 2500 is further provided by the portion of the shank 2350 that contacts the arms 2540, 2560 as they straddle the shank.

Figures 5A, 5B, 5C:
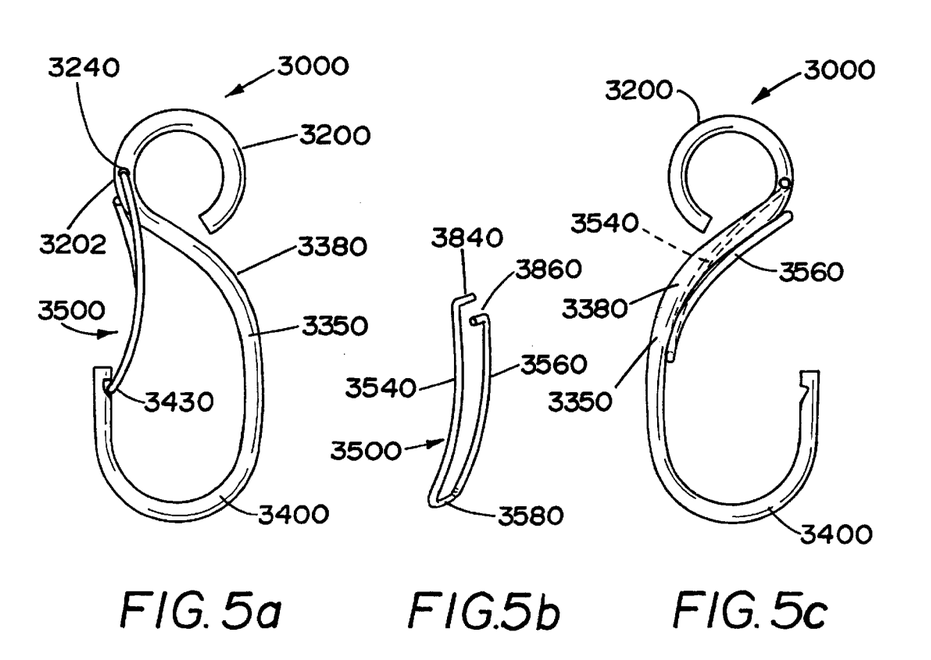

Now turning to FIGS. 5a–c, a second embodiment is shown for snap hook 3000 and gate 3500 in accordance with the present invention. Stem 3840 of the long arm 3540 of the gate fits into a securing hole 3240 located in eyelet 3200. Stem 3860 of the short arm 3560 rests and slides on the outside surface of eyelet 3200.

The configuration of gate 3500 is further detailed in FIG. 5b. In accordance with this embodiment of the present invention, the arms 3540, 3560 are not twisted or offset about head 3580. The long arm 3540 terminates in stem 3840 which is laterally spaced above stem 3860 of short arm 3560. Gate 3500 is then anchored to snap hook 3000 by first placing stem 3840 into securing hole 3240 while at the same time twisting the gate so that arm 3560 and stem 3860 can move past the shank portion of eyelet 3200 at 3202. Gate 3500 is released and allowed to come to rest. The now offset arms 3540, 3560 of the gate create a spring-like force such that the head 3580 of gate 3500 is biased toward a closed position against the inside lip 3420 of the receiving end 3420 of snap hook 3000.

Gate 3500 is also bowed inward to conform with the respective shape of eyelet 3200, ridge 3380 and shank 3350. Accordingly, when gate 3500 is opened, as shown in FIG. 5c, long arm 3540 will straddle the respective portions of eyelet 3200, ridge 3380 and shank 3350. In this embodiment, short arm 3560 will extend along the surface of the respective portions of eyelet 3200 and shank 3350. The bowed configuration of gate 3500 permits an object being received to have unrestricted access to the entire inner space defined by hook 3400. In addition, since arms 3540, 3560 straddle at least a portion of snap hook 3000, lateral support is provided whether gate is closed, fully opened, or partially opened.

Figures 13A, 13B, 14:
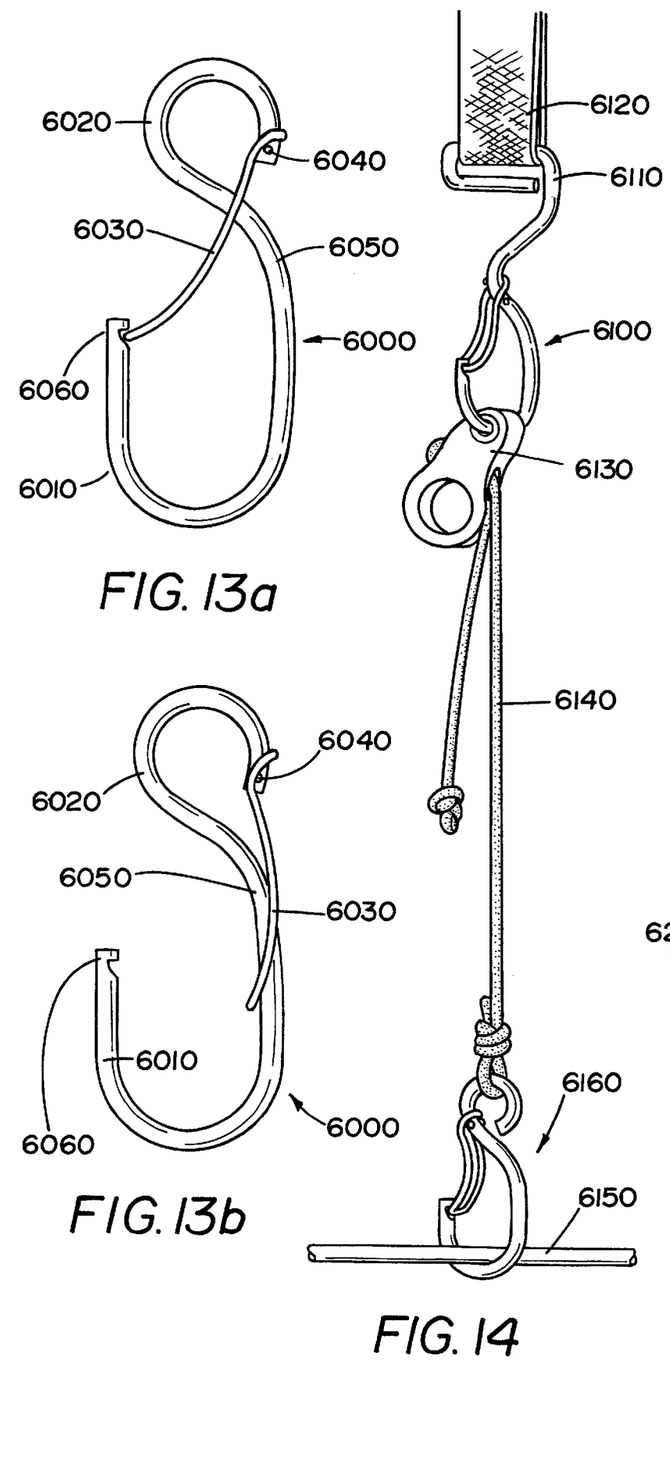
FIGS. 13a and 13b are side views of a snap hook having a gate in a closed and open position, respectively, in accordance with a fourth embodiment of the present invention.
FIGS. 14–16 show snap hooks of the present invention in use with various elastic cords.

Gate 3500 is attached to snap hook 3000 by a single fixed securing hole 3240. Accordingly, the short arm 3560 is free to move. As shown in the embodiment of FIG. 5c, stem 3860 of short arm 3560 slides down the face of eyelet 3200 as gate 3500 is opened. This motion permits gate 3500 to be opened by application of a generally uniform force. In the preferred configuration, stem 3860 is simply a turned-in section. However, stem 3860 may have a boss or protrusion that overhangs either side of snap hook 3000 so as to further prevent lateral displacement of gate 3500. In its preferred configuration, gate 3500 has a long arm 3540 and a short arm 3560. However, the respective lengths of the arms may vary. Accordingly, the arms 3540, 3560 may be of approximately equal length. In addition, the arms 3540, 3560 may connect at any appropriate securing position 3240 along either side of eyelet 3200, such as shown in FIGS. 13a and 13b.

Figure 6A:
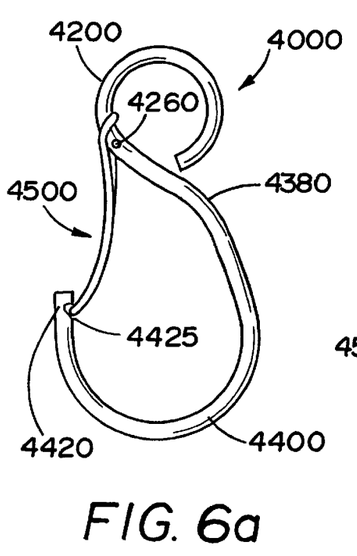
Figures 6B, 6C:
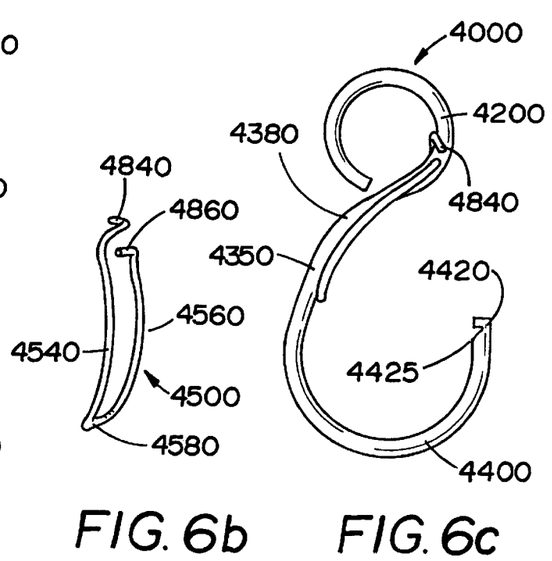

FIGS. 6a–c show a third embodiment in accordance with the present invention including snap hook 4000 and gate 4500. Stem 4860 of the short arm 4560 fits into securing hole 4260 located in the side of eyelet 4200. Wraparound stem 4840 of long arm 4540 has a U-shape configuration in order to wrap around the back or inside of eyelet 4200 as shown in FIG. 6a. Further, as shown in FIG. 6b, the wraparound stem 4840 of long arm 4540 is elevated slightly with respect to stem 4860.

In accordance with this embodiment of the present invention, gate 4500 is attached to snap hook 4000 by first positioning stem 4860 in the securing hole 4310. In this position, the elevation of arm 4540 will place wraparound stem 4840 at rest in front of eyelet 4200. Long arm 4540 is then forced apart from short arm 4560 and the wraparound stem 4840 is placed in position on the inside of eyelet 4200. Long arm 4540 is released, and wraparound stem 4840 falls into position on the inside of eyelet 4200.

The elevation of wraparound stem 4840 creates a spring-like force such that the head 4580 of gate 4500 is biased toward the closed position against the inside lip 4425 of the receiving end 4420 of snap hook 4000 (see FIG. 6a). FIG. 6c shows gate 4500 in the open position. The inside portion of eyelet 4200 provides support to wraparound stem 4840 in opposition to arm 4560. In the open position, stem 4860 pivots in supporting hole 4260, and wraparound stem 4840 is simultaneously lifted and rotated along the back or inside surface of eyelet 4200. The lift and rotation motion provides a smooth opening and closing of gate 4500. Accordingly, gate 4500 can be opened by a generally uniform force.

The end of stem 4840 of long arm 4540 is shown as a polished point. However, the end may be fashioned as a tightly reversed bent end, as shown in FIG. 3. The end 4840, whether a polished point or reversely bent, snugly fits the shank so as not to protrude beyond the front surface of the eyelet 4200 where it could catch or interfere with any objects coming into contact with the front surface of the snap hook 4000.

Gate 4500 is also bowed inwardly to conform with the respective shape of eyelet 4200, ridge 4380 and shank 4350. Accordingly, when gate 4500 is opened, as shown in FIG. 6c, arms 4540, 4560 will straddle the respective portions of eyelet 4200, ridge 4380 and shank 4350. This permits an object being received to have unrestricted access to the entire inner space defined by hook 4400.

Gates 2500, 3500 and 4500 (as shown in FIGS. 4b, 5b and 6b, respectively) are removable so that they may be replaced when damaged. In addition, the different embodiments of the gates 2500, 3500 and 4500 are interchangeable so that a snap hook could receive any gate for which the proper number of supporting holes are provided. Accordingly, if a snap hook has two supporting holes, it could receive any of the three embodiments of gates 2500, 3500 or 4500.

Figure 7:
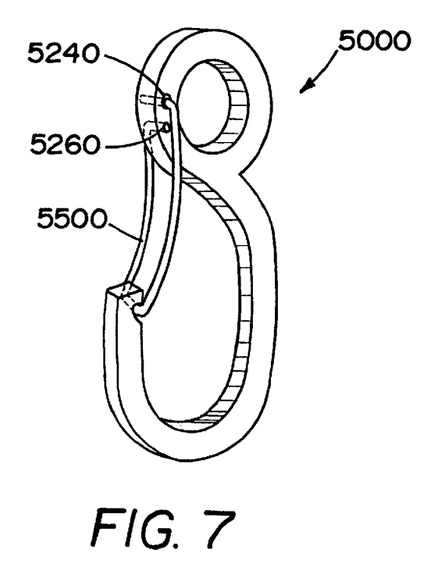
FIG. 7 is a perspective view of a molded plastic snap hook in accordance with the present invention.

Now referring to FIG. 7, a plastic embodiment of the present invention in the form of snap hook 5000 is shown. The surfaces of the body of snap hook 5000 are generally flat with rounded or beveled edges (not shown). The gate 5500 is preferably metal, though may alternatively be comprised of a flexible and resilient hard plastic material. The plastic snap hook 5000 is shown having two supporting holes 5240, 5260 for receiving stems 5840, 5860 of gate 5500, respectively. Supporting hole 5240 receives long stem 5840 and comprises an elongated slot. The slot permits stem 5840 to slide back and forth as gate 5500 is opened and closed, respectively. In this manner, slot 5240 permits gate 5500 to be opened by a generally uniform force.

The plastic snap hook 5000 prevents objects from becoming scratched or damaged during use, as might occur with metal snap hooks. Also, plastic snap hooks are particularly well suited for environments in which rust is otherwise a problem, such as for boats and camping. In an alternative embodiment, the metal snap hooks disclosed herein, such as hook 1000 and gate 500 (FIG. 3), may be coated or encased in a suitable plastic or rubber material, or the like.

Figure 8:
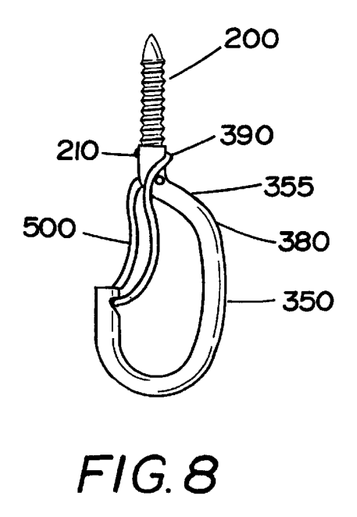
FIGS. 8–12 are perspective views of snap hooks in accordance with the present invention which have a variety of engaging devices opposite the hook.
Figure 9:
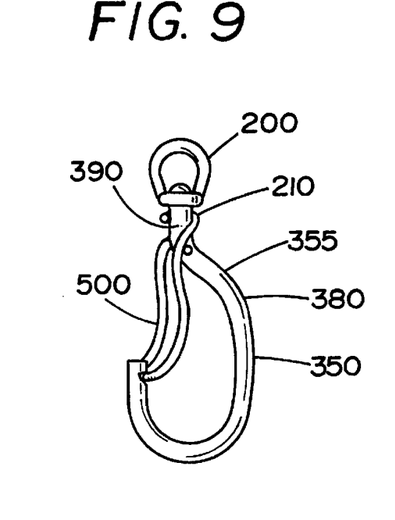
Figure 10:
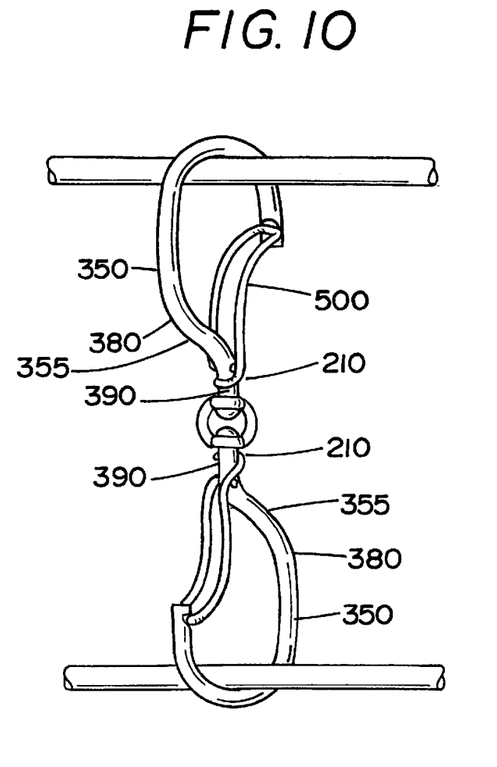
Figure 11:
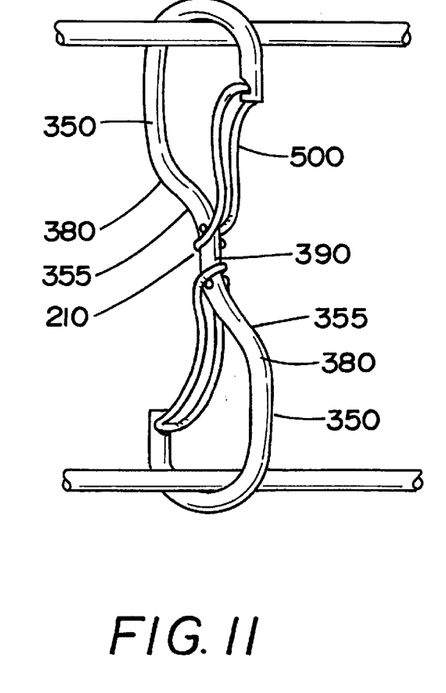

The snap hook of the present invention has numerous applications and alternative embodiments. The engaging portion of the snap hook, such as eyelet 205 in FIG. 3, may be configured as a variety of complimentary components. FIG. 8, for instance, shows a similar snap hook configured with an integral wood screw at the base of the hook portion. The pointed wood screw may further be configured as a flat headed metal screw. In addition, the snap hook may be integral with a swivel base (FIG. 9) or connected back to back with a second snap hook by a swivel or fixed stem of varying lengths (FIGS. 10, 11).

Figure 12:
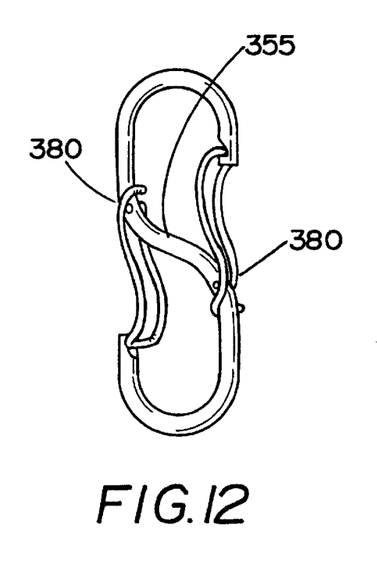

In the embodiments of FIGS. 8–11, securing portion 210 has a connecting rod 390 that connects shank 350 with the engaging portion 200. In addition, shank 350 has an extension 355 that curves sharply away from connecting rod 390 and connects with ridge 380. In the preferred embodiment, extension 355 forms an approximate 45° angle with connecting rod 390. Similarly, FIG. 12 shows a double-gated snap hook in which both hook portions and respective gates are similar in size, but open in opposite directions. A connecting rod 355 extends from ridges 380 to connect the respective hooks.

FIGS. 13a and 13b show an S-shaped snap hook 6000 having a hook portion 6010 and an engaging portion 6020. A single gate 6030 extends from the lip 6040 of the engaging portion, across the mid section 6050 of the snap hook, and rests on the inside lip 6060 of the hook portion. FIG. 13a shows the snap hook with the gate in a closed position. The stems of the gate attach at the lip 6040 and the gate straddles both sides of the mid section. FIGS. 13a and 13b show the use of a wraparound stem. However, the snap gate may be simply modified to accommodate any of the gates of FIGS. 4b, 5b or 6b.

Figure 15:
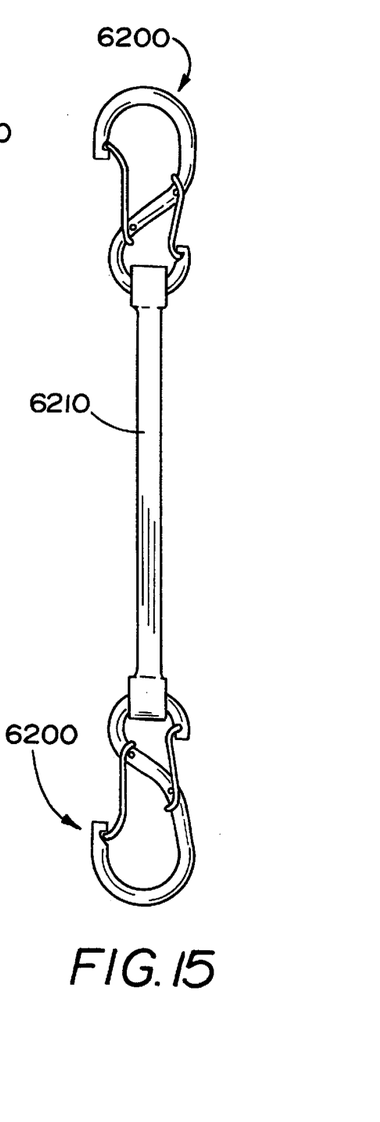

FIGS. 14–20 show alternative applications of snap hooks in accordance with the present invention. FIG. 14 shows a snap hook 6100 configured to include an oblong eyelet 6110 for receiving a strap 6120. The hook is attached to a "ROPELOCK"™ device 6130 having a rope 6140 which in turn is secured to a tie rod 6150 with another snap hook 6160 constructed in accordance with the present invention. FIG. 15 shows a snap hook 6200 connected to both ends of an elastic tie down 6210. In this application, a snap hook in accordance with the present invention is substituted for the conventional S-hook normally used.

Figures 16, 17:
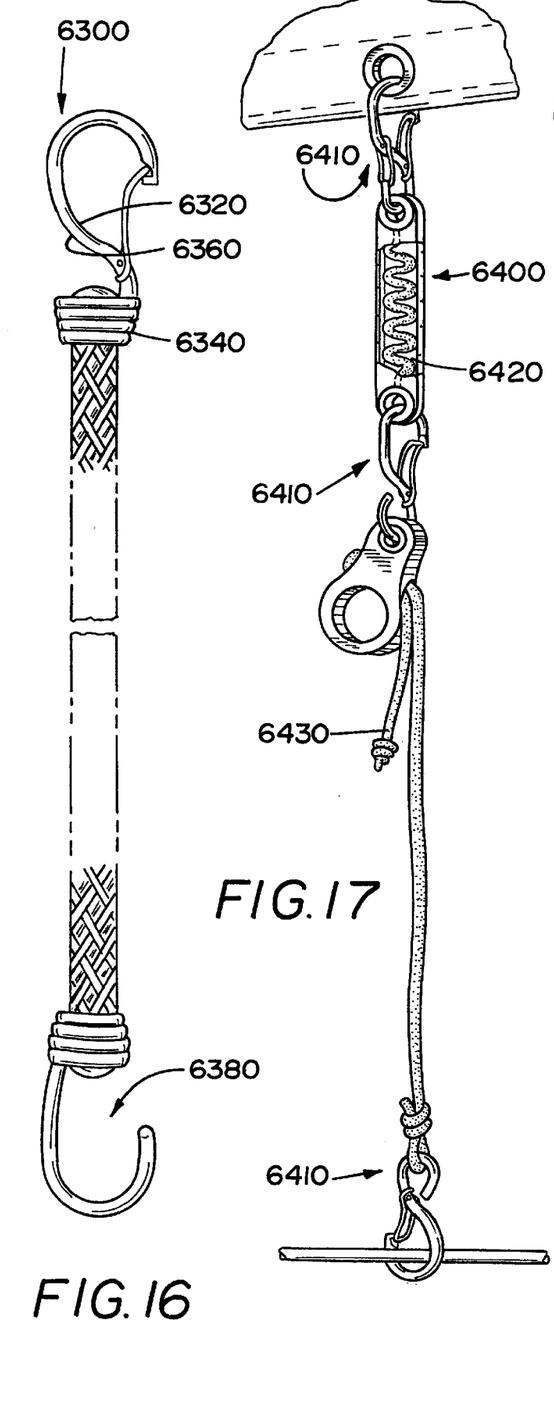
FIG. 17 is a perspective view of a snap hook of the present invention utilized in conjunction with one embodiment of an elastic tie down in accordance with the present invention.

The snap hooks of the present invention may also be used in conjunction with bungee cord. FIG. 16, for instance, shows a snap hook 6300 connected to a first end of a bungee cord 6310. The snap hook has an extension 6320 that curves sharply away from engaging means 6340 and extends to ridge 6360. A plain hook 6380 is attached to the opposite end of the bungee cord. Both the plain hook 6380 and the snap hook 6300 are shown having a plastic coating applied in any known conventional manner.

Figure 18:
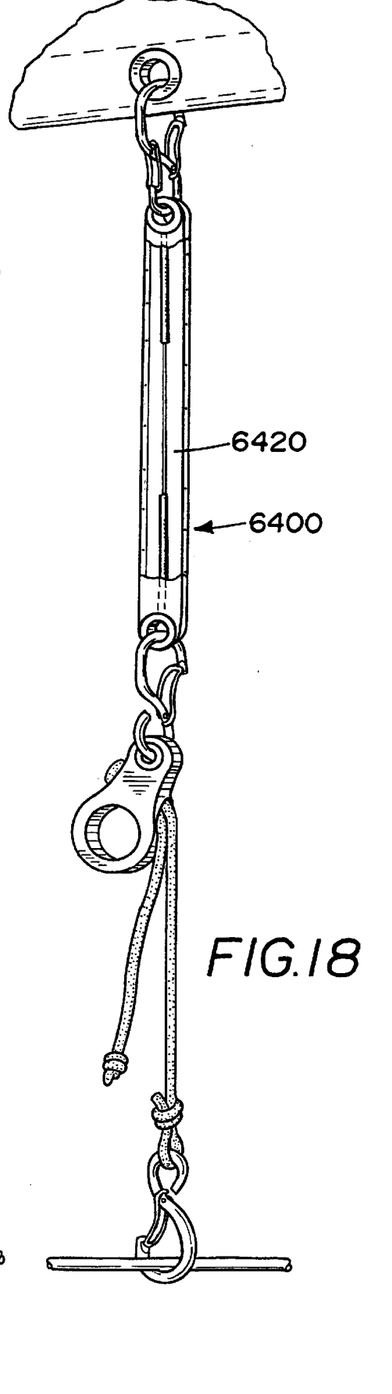
FIG. 18 is a perspective view of the snap hook and elastic tie down of FIG. 17, with the adjustable rope lock pulling the elastic cord down.

FIGS. 17 and 18 show an elastic tie down or "bungee" cord 6400 used in association with snap hooks 6410 and a "Ropelock" in accordance with preferred embodiments of this invention. An insert 6420 is sandwiched between two halves of tie down 6400 and is sonic welded to the tie down 6400. Insert 6420 is configured so that its ends are thicker than the center portion. When tie down 6400 is stretched, the center portion will straighten out first. Accordingly, a greater proportion of force will be required to stretch tie down 6400 after the center portion has straightened which will prevent overexpanding the "bungee" cord.

The elastic tie down 6400 and insert 6420 are stretched by pulling down on the free end of the rope 6430. As the rope is tightened, the tie down 6400 stretches. FIG. 18 shows tie down 6400 fully stretched. However, a user may wish to only partially stretch tie down 6400 so that there is room for the insert 6420 to expand and contract as different temperatures and weather conditions are encountered. Moreover, the tie down 6400 should only be tightened to the extent the tarpaulin eyelet will not rip, pull or tear.

Tie down 6400 will contract to account for any loosening of the tarpaulin due to shrinking, settling, or shifting loads. In addition, tie down 6400 will expand to account for any constriction of the tarpaulin, perhaps due to shifting of the load or partial removal of the tarpaulin by a user.

Figures 19, 20, 21:
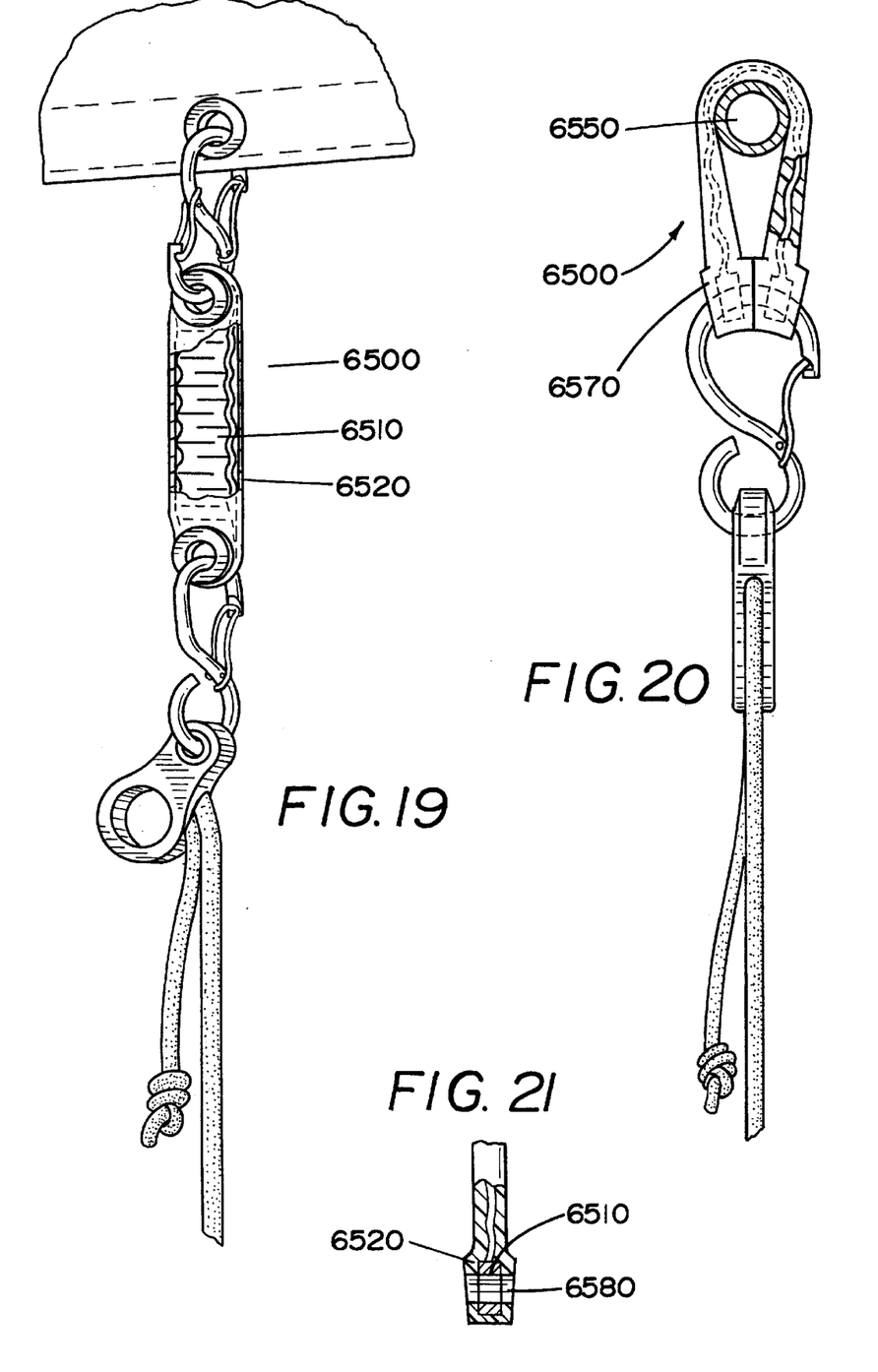
FIG. 19 is a perspective view of a snap hook of the present invention utilized in conjunction with a second elastic tie down in accordance with the present invention.
FIG. 20 is a side view of the snap hook and elastic tie down of FIG. 19 in which the tie down is wrapped about a car luggage rack and both ends of the tie down are received in the snap hook.
FIG. 21 is an exploded side view of the end portion of the elastic tie down of FIG. 19.

FIG. 19 shows an alternative embodiment of an elastic tie down 6500 in accordance with the present invention. An insert member 6510 is a flattened material that is folded back and forth as an accordion or washboard. The insert member 6510 comprises an elastic material, such as polyurethene or polyethylene, which is capable of stretching to about twice its length. The insert member 6510 is surrounded by a sheath 6520 that comprises a flexible bungee-like material.

FIG. 20 shows the elastic tie down 6500 for use with a conventional vehicle roof rack rod 6550. The tie down 6500 may be looped around the rod 6550 so that each end of tie down 6500 is received by the snap hook 6560. The snap hook is especially well adapted for use with tie down 6500 since the snap hook permits the tie down 6500 to be attached and detached quickly and without complication while at the same time ensuring that the tie down does not become accidentally detached.

FIG. 21 is an exploded side view of the end portion 6570 of elastic tie down 6500, shown here for the elastic tie down 6500 of FIG. 20. A through-hole 6580 is centrally located about end portion 6570. The through-hole 6580 may be fitted with an eyelet, as shown in FIG. 19. Insert member 6510 circumscribes through-hole 6580 and is surrounded by sheath 6520.

Figure 22:
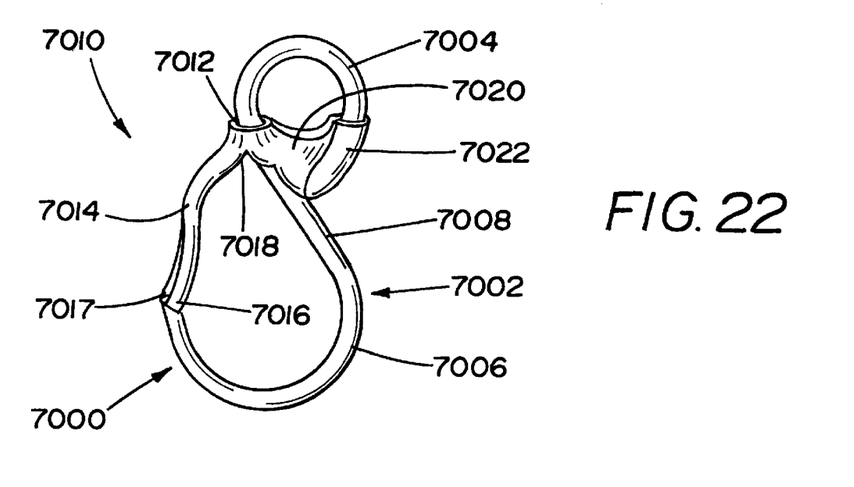
FIG. 22 is a side elevational view of an embodiment of the invention in which the gate is constructed of plastic material and can be replaced.
Figures 23, 24:
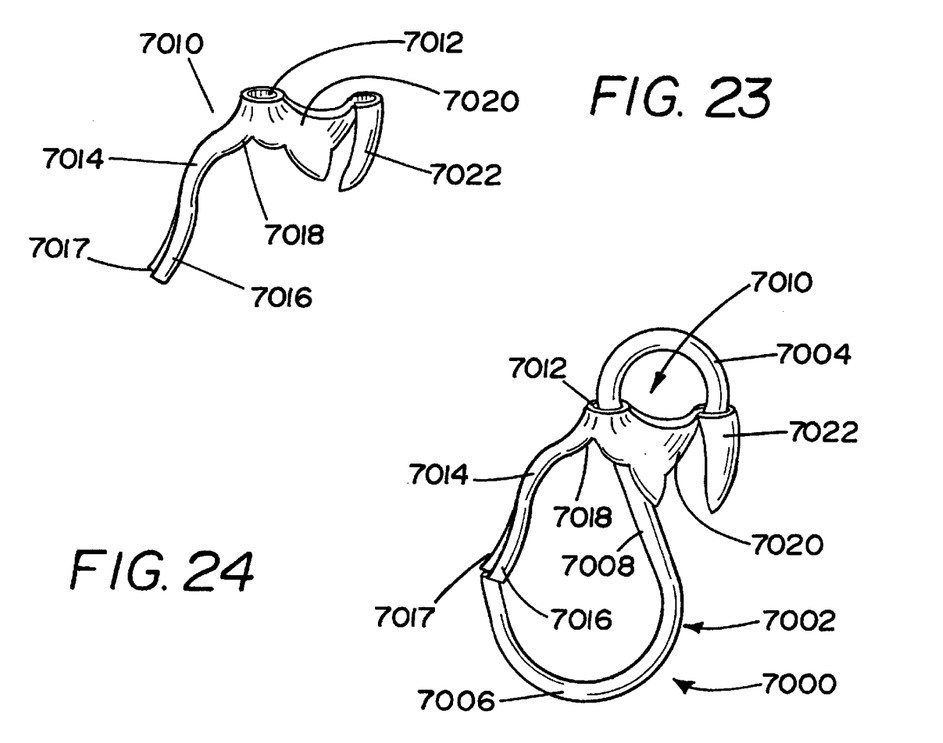
FIG. 23 is a perspective view of the plastic gate prior to assembly with the hook.
FIG. 24 is a side elevational view of the plastic gate assembled onto the hook prior to the final step of bending the upper loop of the hook toward the shank to lock the gate in position on the hook.

The embodiment of the snap hook with pivotal gate illustrated in FIGS. 22–24 is generally designated by reference numeral 7000 and includes a wire hook 7002 having a downwardly opening upper loop 7004 and an upwardly opening lower loop 7006 interconnected by an inclined shank 7008. The upper loop 7004 is smaller than the lower loop 7006. The hook 7002 is of one piece wire construction and is formed from a straight piece of wire in a manner well known in the art. Mounted on the hook 7002 is a plastic gate 7010 which includes a tubular body or sleeve 7012 slidably mounted on the hook 7002 and is assembled onto the hook by sliding the tubular body onto the end of lower loop 7006 and sliding it onto the shank 7008.

The body 7012 of the plastic gate 7010 includes a laterally extending bowed gate member 7014 which includes a terminal end 7016 that engages the inner surface of the free end of lower loop 7006. The terminal end 7016 of the gate member 7014 includes a channel or groove 7017 on its outer surface which receives and engages the inwardly facing surface of the terminal end portion of the lower loop 7006 in order to laterally stabilize the terminal end of the gate member 7014 in relation to the lower loop 7006. The bottom surface of the gate member 7014 is provided with a notch or groove 7018 adjacent the body 7012 to form a "living hinge" connection to the body 7012 and enable inward and downward pivotal movement of the gate member 7014 to an open position adjacent the shank to enable various items to enter the upper end of the lower loop. The memory characteristics of the plastic material, such a polyethylene, polyurethene and the like, will return the gate member 7014 to closed position when opening pressure exerted on the gate member 7014 is released.

The plastic gate body 7012 includes a stabilizing arm 7020 extending laterally opposite to the gate member 7014. The stabilizing arm 7020 terminates in a sleeve 7022 which is slid onto the terminal end portion of the upper loop 7004 as shown in FIG. 23. The terminal end of the upper loop 7004 is then bent inwardly toward the shank 7008 to a final position adjacent the shank 7008 to lock the plastic gate 7010 to the hook 7000. The plastic gate 7010 can be replaced by bending the terminal end of the upper loop 7004 back to the position illustrated in FIG. 24 and sliding the plastic gate 7010 off the hook and then assembling another plastic gate onto the hook 7000 and bending the upper loop 7004 back to the position as shown in FIG. 22. The sleeve 7022 may be cylindrical to slide onto loop 7004 or it may have a cross-sectional configuration slightly more than semicylindrical to snap laterally onto the upper loop 7004.

The embodiment of the snap hook with pivotal gate illustrated in FIGS. 25–28 is generally designated by reference numeral 8000 and includes a wire hook 8002 having a downwardly opening upper loop 8004 and an upwardly opening lower loop 8006 interconnected by an inclined shank 8008 in a manner similar to that illustrated in FIGS. 22 and 24.

Figures 25A, 25B, 26, 27:
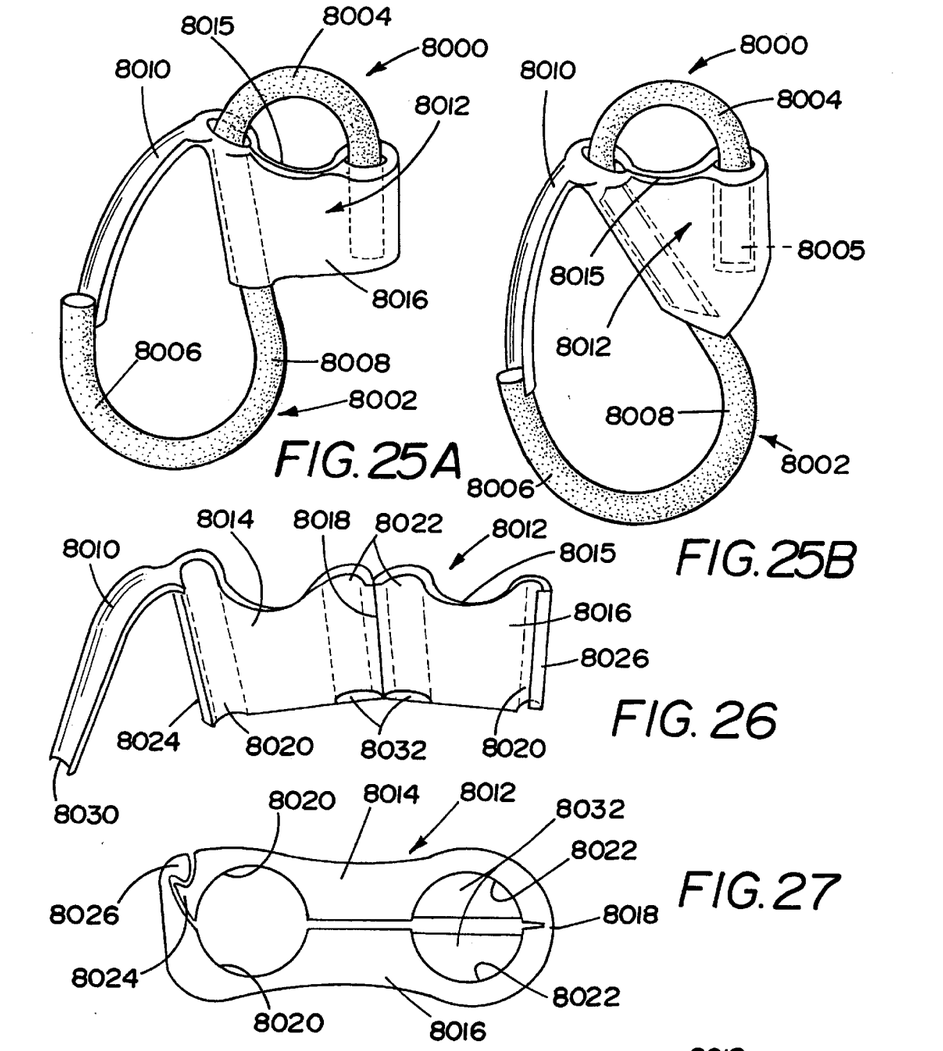
FIGS. 25a and 25b are perspective views of embodiments of the invention in which the gate and its mounting structure are constructed of plastic material with the mounting structure folded around and secured to the eyelet section and shank of the hook.
FIG. 26 is a perspective view of the one-piece gate and mounting structure prior to folding the mounting structure around the hook.
FIG. 27 is a top plan view of the mounting structure in its folded position with the gate being omitted for clarity.
Figure 28:
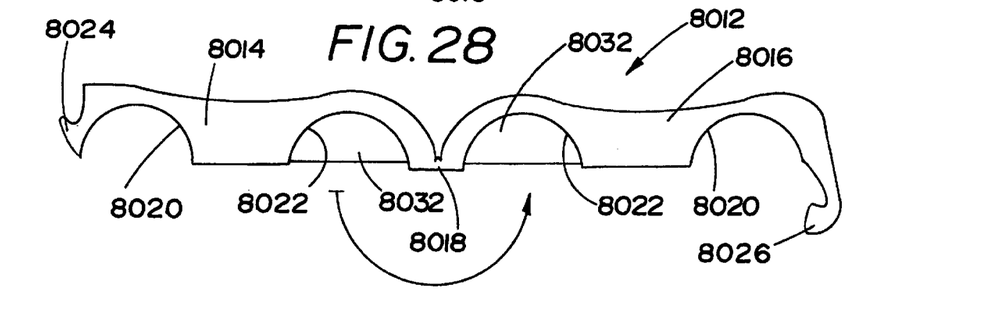
FIG. 28 is a top plan view of the mounting structure of FIG. 27 in its unfolded condition prior to assembly on the hook.

Mounted on the hook 8002 is a plastic gate 8010 integral with a plastic mounting structure generally designated by reference numeral 8012. The plastic mounting structure 8012 includes plastic panels 8014 and 8016 that are hingedly connected by a "living" hinge 8018 to enable the panels to be folded from the unfolded condition as illustrated in FIGS. 26 and 28 to the folded condition as illustrated in FIG. 27 when the mounting structure 8012 is installed on the hook 8002 as illustrated in FIGS. 25a and 25b. Each of the panels 8014 and 8016 includes a pair of generally semi-cylindrical grooves 8020 and 8022 with grooves 8020 being located adjacent the free end of the panels and grooves 8022 being located adjacent the hinge 8018. When the panels 8014 and 8016 are folded into their mounted position, the grooves define cylindrical sleeves which receive the free end of the upper loop 8004 and the shank 8008 of the hook 8002 as illustrated in FIGS. 25a and 25b.

To secure the panels 8014 and 8016 in their folded mounted position on the hook, the free end of panel 8014 includes a notch or recess 8024 on its outer edge surface and the free end of the panel 8016 includes a projecting hook shaped edge 8026 which will lockingly engage the notch 8024 when the panels are wrapped around and mounted on the hook shank 8008 and free end of the upper loop 8004 when the mounting structure 8012 is mounted on the hook 8002.

As shown in FIGS. 25a, 25b and 26, the top edge of each panel 8014 and 8016 is curved arcuately to form a concave edge 8015. This structure provides an enlarged eyelet in the upper loop 8004 which enables larger articles, anchor devices and the like to be received in the space above the mounting structure 8012 as shown in FIGS. 25a and 25b. As an alternative to the notch 8024 and hook edge 8026 or in addition thereto, a small clamp bolt or bolts may be inserted through the panels 8014 and 8016 to secure them in folded relation to securely retain the mounting structure 8012 on the hook and still enable easy replacement of the gate and mounting structure if necessary.

The gate 8010 is integral with the upper end of the free end of panel 8014 and includes a groove 8028 which corresponds to the groove 8020 and thus receives the shank 8008 of the hook when mounted thereon. The gate 8010 extends downwardly and is of channel shaped configuration with the free end terminating in a notch 8030 which engages the inner surface and side surfaces of the free end of the lower loop 8006 of the hook thereby laterally stabilizing the gate 8010 when in closed position as illustrated in FIGS. 25a and 25b. The resilient flexibility of the gate 8010 enables it to pivot inwardly to a position adjacent the shank 8008 thereby providing a wide unobstructed mouth or entrance area for the lower loop 8006 on the hook 8012.

As illustrated in FIG. 26, the grooves 8020 and 8022 converge downwardly to conform with the downward convergence of the free end of the upper loop 8004 and the shank 8008 of the hook 8002. Also, each groove 8022 includes a bottom inwardly extending upwardly facing shoulder 8032 which forms a closure for the bottom of the cylindrical sleeve formed by grooves 8022 which engages the lower end of the upper loop 8004. The shoulders 8032 and the downward convergence of grooves 8020 and 8022 lock the mounting structure on the hook 8002 in a manner to prevent upward vertical movement of the mounting structure in relation to the hook 8002 while still permitting assembly and disassembly of the mounting structure 8012 and gate 8010 in relation to the hook 8002. The free end 8005 of the upper loop 8004 may be bent toward shank 8008 so that the downward convergence of the shank and free end prevent downward movement of the mounting structure 8012 as shown in FIG. 25b. As illustrated in FIG. 26, the gate and mounting structure are of one-piece plastic material which can be injection molded in a conventional manner and easily assembled onto the hook.

The use of a plastic gate eliminates the necessity of forming hooks or slots in the hook and the necessity of assembling the end or ends of the spring wire gate with the hook by first aligning the laterally extending end of the wire gate with the hole or slot and then inserting it into the relatively small hole or slot. All of the embodiments of this invention enables the gate to be replaced when necessary.

Figure 29:
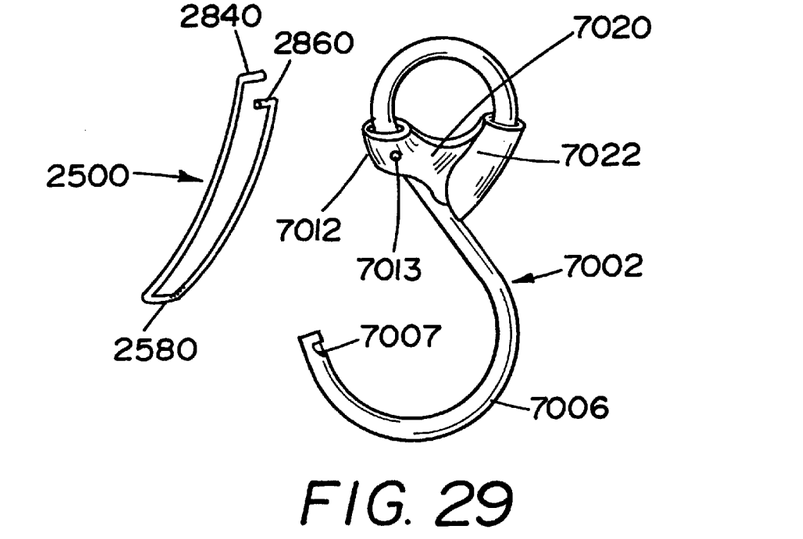
FIG. 29 illustrates the embodiment of FIG. 22 in combination with a wire gate as shown in FIGS. 4b and 5b.

FIG. 29 illustrates the wire hook 7002 in FIG. 22 with the plastic tubular body or sleeve 7012, stabilizing arm 7020 and sleeve 7022 molded on the hook. However, the plastic bowed gate member 7014 has been omitted and is replaced by a wire gate 2500 disclosed in more detail in FIG. 4b. In order to mount the wire gate 2500 on the plastic body 7012, a hole or socket 7013 is formed in opposite sides of body 7012 to receive the inturned ends 2840 and 2860 of the spring wire gate 2500. The inner surface of the lower loop 7006 of the hook 7002 is provided with a notch 7007 to engage and stabilize the web portion 2580 of the wire gate 2500. The spring wire construction of the wire gate enables the ends to be sprung apart to snap into the holes 7013. The wire gate functions in the same manner as in FIGS. 4a and 4c with the offset relation of the inturned ends engaging the offset holes 7013 resiliently biasing the wire gate 2500 to a closed position.

Figure 30:
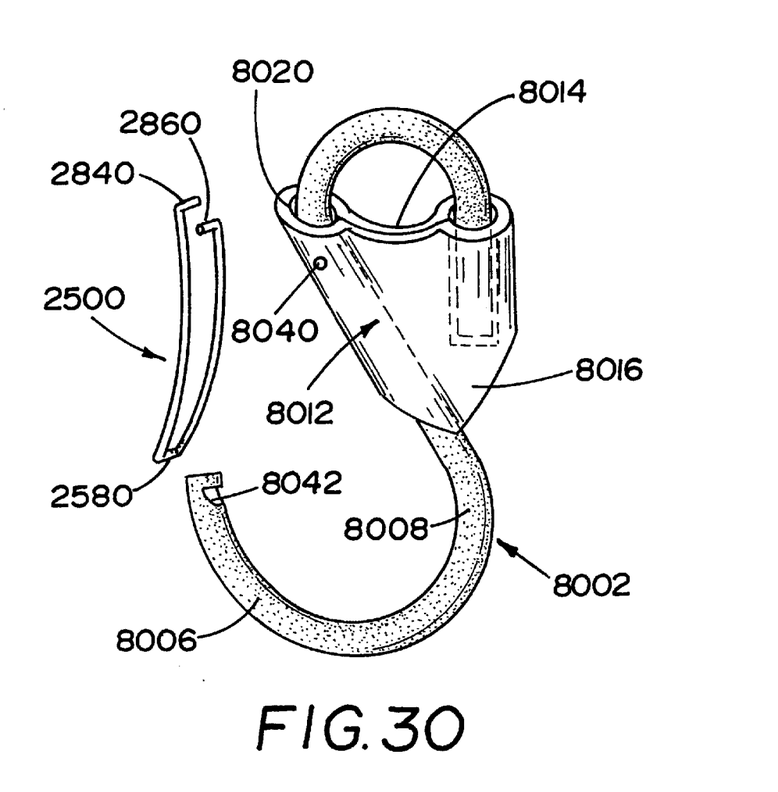
FIG. 30 illustrates the embodiment of FIG. 25b in combination with a wire gate as shown in FIGS. 4b and 5b.

FIG. 30 illustrates the wire hook 8002 in FIG. 25b with the folded mounting structure 8012 mounted thereon except for the plastic gate member 8010 being omitted and replaced by wire gate 2500 disclosed in FIG. 4b. The plastic panels 8014 and 8016 have holes or sockets 8040 in the outer surface in alignment with the grooves 8020 which receive the shank 8008 of the hook 8002. The holes or sockets 8040 receive the inturned ends 2840 and 2860 of the spring wire hook 2500 and the inner surface of the terminal end of the lower loop 8006 of the hook includes a notch 8042 to receive and stabilize the web portion 2580 of the wire gate 2500. The gate 2500 is assembled with the mounting structure 8012 by springing the ends 2840 and 2860 apart and releasing them to snap into the holes 8040. The wire gate 2500 when combined with hook 8002 and mounting structure functions in the same manner as in FIGS. 4a and 4c.

The structure disclosed in FIGS. 29 and 30 eliminates the necessity of forming holes or sockets in the metal shank of the wire hook which presents problems due to the small cross-sectional area and rounded surface of the hook shank. When the hook is made of stainless steel for nautical use, forming small diameter holes in the shank becomes quite labor intensive. These structures also eliminate problems which may exist when the plastic gate members are used in very cold weather which tends to harden plastic material thus making it more brittle and subject to breaking after a smaller number of flexing cycles than when at temperature conditions normally encountered.

The foregoing descriptions and drawings should be considered as illustrative only of the principles of the invention. Numerous modifications and applications of the present invention will readily occur to those skilled in the art. For example, the preferred embodiment employs a gate having a curvature that conforms to the shape of the shank and eyelet. However, any suitable curvature may be utilized, including straight arms or even a slight outward bend. Also, the bowed gate may be implemented in a link, or other like device.

Likewise, the gate need not be a round wire construction. Rather, the gate may be a cutaway tube designed to fully cover the respective portions of shank and eyelet when the gate is fully opened. In addition, although the snap hook of the preferred embodiments is formed from a round metal rod, the cross section of the hook body may be molded in any convenient shape. Therefore, it is not desired to limit the invention to the specific examples disclosed or the exact construction and operation shown and described. Rather, all suitable modifications and equivalents may be resorted to, falling within the scope of the invention.

I claim:

1. A snap hook for interconnecting objects which comprise:

a body having an engaging component capable of engaging at least one first object and a hook component for removably engaging at least one second object, said hook component including a shank and a curved section with said shank connected to said engaging component and said curved section and said curved section terminating in a receiving end; and an elongated hinged gate having a pair of arms interconnected by a head and with connect means for pivotally attaching said gate to said body such that when said gate is in a full open position the arms of said gate straddle a substantial portion of said body to provide a substantially unobstructed opening for said second object to engage said hook component, said connect means comprising a long arm having a first stem and a short arm having a second stem, said first stem being attached to a slot-shaped hole in said engaging component, said second stem being attached to a through-hole in said engaging component.

2. A snap hook for interconnecting objects which comprise:

a body having an engaging component capable of engaging at least one first object and a hook component for removably engaging at least one second object, said hook component including a shank and a curved section with said shank connected to said engaging component and said curved section and said curved section terminating in a receiving end; and an elongated hinged gate having a pair of arms interconnected by a head and with connect means for pivotally attaching said gate to said body such that when said gate is in a full open position the arms of said gate straddle a substantial portion of said body to provide a substantially unobstructed opening for said second object to engage said hook component, said connect means comprising a long arm having a first stem and a short arm having a second stem, wherein said first stem comprises a curved receiving portion for wrapping around the back of said engaging component and said second stem attaches to a through-hole in said engaging component.

3. The snap hook of claim 1 further comprising a notch located on an inside lip on said receiving end for receiving the head of said gate.

4. The snap hook of claim 1 wherein said hinged gate is replaceable.

5. A snap hook for interconnecting objects which comprise:

a body having an engaging component capable of engaging at least one first object and a hook component for removably engaging at least one second object, said hook component including a shank and a curved section with said shank connected to said engaging component and said curved section and said curved section terminating in a receiving end; and an elongated hinged gate having a pair of arms interconnected by a head and with connect means for pivotally attaching said gate to said body such that when said gate is in a full open position the arms of said gate straddle a substantial portion of said body to provide a substantially unobstructed opening for said second object to engage said hook component, said hook portion comprising a primary hook and said engaging component comprising a secondary hook having a hinged gate for removably engaging a distant object.

6. A link for connecting to an object comprising:

a securing portion;

a curved hook portion connected to said securing portion, said curved hook portion terminating in a receiving end having an inside lip; and, a hinged gate having a head and connect means for pivotally attaching said gate to said securing portion and biased in a closed position where said head rests on said inside lip of said curved hook portion and extends to an open position to removably engage said link with said object, said connect means allowing said gate to move from said closed position to said open position by application of a substantially uniform force on said gate, said gate including a long arm having a first stem and a short arm having a second stem and wherein said connect means comprises a lateral hole in said securing portion for securing said second stem for pivotal movement therein and a guiding surface on said securing portion for controlled sliding of said first stem thereon during opening and closing of said gate.

7. A tie down device for tying down one component to another fixed component which comprises a snap hook having a generally S-shaped body with a securing element fixedly secured to an adjustable rope lock and a hook element for attaching to said one component to be tied down, said snap hook also having a generally U-shaped gate with arms interconnected at one end and spaced apart stems at the other end connected to said body along said securing element to bias said gate to a closed position across an otherwise open mouth of said hook element and to provide for opening said gate by the application of a substantially uniform force, a flexible rope extending through said adjustable rope lock with the free ends of the rope exiting as a taut rope segment and a pull rope segment, said taut rope segment for attachment to said fixed component, said adjustable rope lock causing said one component to move toward said fixed component upon pulling of the pull rope segment through said rope lock and shortening said taut rope segment, said rope lock further frictionally locking said rope in place when said rope lock is in one position and releasing said rope when said rope lock is moved to another position.

8. A snap hook comprising spaced loops opening towards each other on opposite sides of a connecting shank, a plastic body mounted on said shank adjacent an upper of said loops, a spring wire gate extending between said plastic body and a terminal end of a lower of said loops, said wire gate comprising a one-piece spring wire including a pair of generally parallel side members, a web portion interconnecting one end of said side members, offset inturned ends on said side members remote from said web portion, said plastic body including outwardly opening offset recesses pivotally receiving said inturned ends on said wire gate, said web portion resiliently engaging a terminal end portion of the lower of said loops to enable access to said lower loop.

9. The snap hook as defined in claim 8 wherein said plastic body is molded onto said shank and a terminal end portion of the upper loop.

10. The snap hook as defined in claim 8 wherein said plastic body is folded around and anchored to said shank and a terminal end portion of the upper loop.

11. The snap hook as defined in claim, 8 wherein said plastic body extends between the shank and a terminal end of the upper of said loops, said plastic body having an upper edge portion spaced from an upper curved portion of the upper loop to enable the upper loop to be connected to receive a supporting member.

* * * * *